United States Patent Office 2,762,800
Patented Sept. 11, 1956

2,762,800

MANUFACTURE OF HEXAMETHYLENE-
TETRAMINE

Fritz Meissner, Rodenkirchen, near Koln, and Ernst Schwiedessen, Koln-Marienburg, Germany, assignors to Josef Meissner, Koln-Bayenthal, Germany, a German firm No Drawing. Application February 14, 1952,
Serial No. 271,628

Claims priority, application Germany February 19, 1951

2 Claims. (Cl. 260—248.6)

Hexamethylenetetramine is produced with a great evolution of heat on the action of formaldehyde on ammonia. In the known processes, the removal of the heat of reaction involves difficulties. In addition, although large quantities of heat are required for the subsequent evaporation of the solution of hexamethylenetetramine, the heat of reaction is lost. By the term "heat of reaction" used herein is to be understood the total heat of absorption, of solution and of the reaction proper.

It has now been found that the removal of heat of reaction, as well as its utilisation, is possible in the following manner.

The reaction between formaldehyde and ammonia is carried out at the boiling point of the reaction mixture, so that the heat of reaction effects an evaporation of the corresponding quantity of water or other solvent. By selecting suitable pressure conditions, with, if required, the addition of another gas, the boiling point can be fixed as required for the most favorable reaction temperature. By the term "boiling point" is to be understood the temperature at which the vapour pressure of the solvent is equal to or greater than the partial pressure of the solvent in the gaseous phase that comes into contact with the liquid.

In general, the reaction between the formaldehyde and the ammonia is carried out in solution, for which purpose water or other solvent, e. g., alcohol, can be employed.

It is not of decisive importance in the reaction which component is first in solution. Fundamentally, four cases are possible:

(a) Formaldehyde is dissolved and gaseous ammonia is passed into the solution or otherwise brought into contact with the solution, for example in a trickling tower. In the course of the process, the solution is found to contain the reaction product in increasing concentration in addition to the free aldehyde.

(b) The ammonia is dissolved and gaseous aldehyde is employed. A result corresponding to that obtained in the case (a) is obtained in this case.

(c) Gaseous ammonia and gaseous aldehyde are brought together with a solvent or with a solution that already contains dissolved reaction product.

(d) Dissolved ammonia and dissolved formaldehyde are interacted.

The reaction arrangement employed in any particular case is left to choice and is determined by, for example, working requirements.

The invention will now be explained with the aid of two examples of embodiment which, however, are non-limitative.

Example 1

Trickling through a column, a trickling tower or the like, from the top, is a solution of formaldehyde which meets an ascending current of gaseous ammonia which is passed in at the bottom. The pressure is adjusted to, for example, about 150 mm. of mercury which corresponds to a boiling temperature of the water of about 60° C. The proportioning of the ammonia is effected, for example, so that a pH-regulating apparatus is always regulated to a neutral outflowing mixture. The reaction column is connected at the top with a vacuum pump through a condenser in which the evaporated solvent is condensed. The hexamethylenetetramine is, as usual, obtained by evaporation in a vacuum evaporator. The yield of hexamethylenetetramine amounts to 98.3%.

In the liquid distilled off, only traces, 2% at most, of ammonia or formaldehyde are to be found.

Example 2

In order to obtain pure hexamethylenetetramine without recrystallisation, instead of obtaining the hexamethylenetetramine by evaporating the solution to dryness, the solution may be evaporated only to the condition of a concentrated solution and the hexamethylenetetramine precipitated from this concentrated solution with ammonia in, for example, a trickling tower. The ammoniacal mother liquor is reacted in vacuo with formaldehyde, the heat of reaction being utilised for evaporation and the added formaldehyde being proportioned by a pH-regulating apparatus. A 99% yield is obtained. The condensate is practically free from ammonia and formaldehyde.

The process may be made continuous by employing suitable regulating apparatus, for example pH-regulating apparatus, polarographs or conductivity meters.

What we claim is:

1. A continuous process for the production of hexamethylenetetramine in substantially quantitative yield, which comprises reacting ammonia and formaldehyde, in solution in water, without external cooling and with proportioning of the feed of said formaldehyde to said ammonia to maintain a neutral outflowing mixture, said reaction being carried out at the boiling point of the reaction mixture under reduced pressure, and simultaneously completely removing water of reaction from said reaction mixture by evaporation thereof and solely by the direct action of the heat of the reaction.

2. A process according to claim 1, wherein the said pressure is about 150 mm. of mercury and the said boiling point is at about 60° C.

References Cited in the file of this patent

UNITED STATES PATENTS

| 2,249,177 | Schlach | July 15, 1941 |
| 2,423,200 | Wighton | July 1, 1947 |
| 2,449,040 | Schideler | Sept. 7, 1948 |
| 2,542,315 | Eickmeyer | Feb. 20, 1951 |
| 2,573,374 | Wichterle | Oct. 30, 1951 |
| 2,579,851 | Novotny | Dec. 25, 1951 |